UNITED STATES PATENT OFFICE.

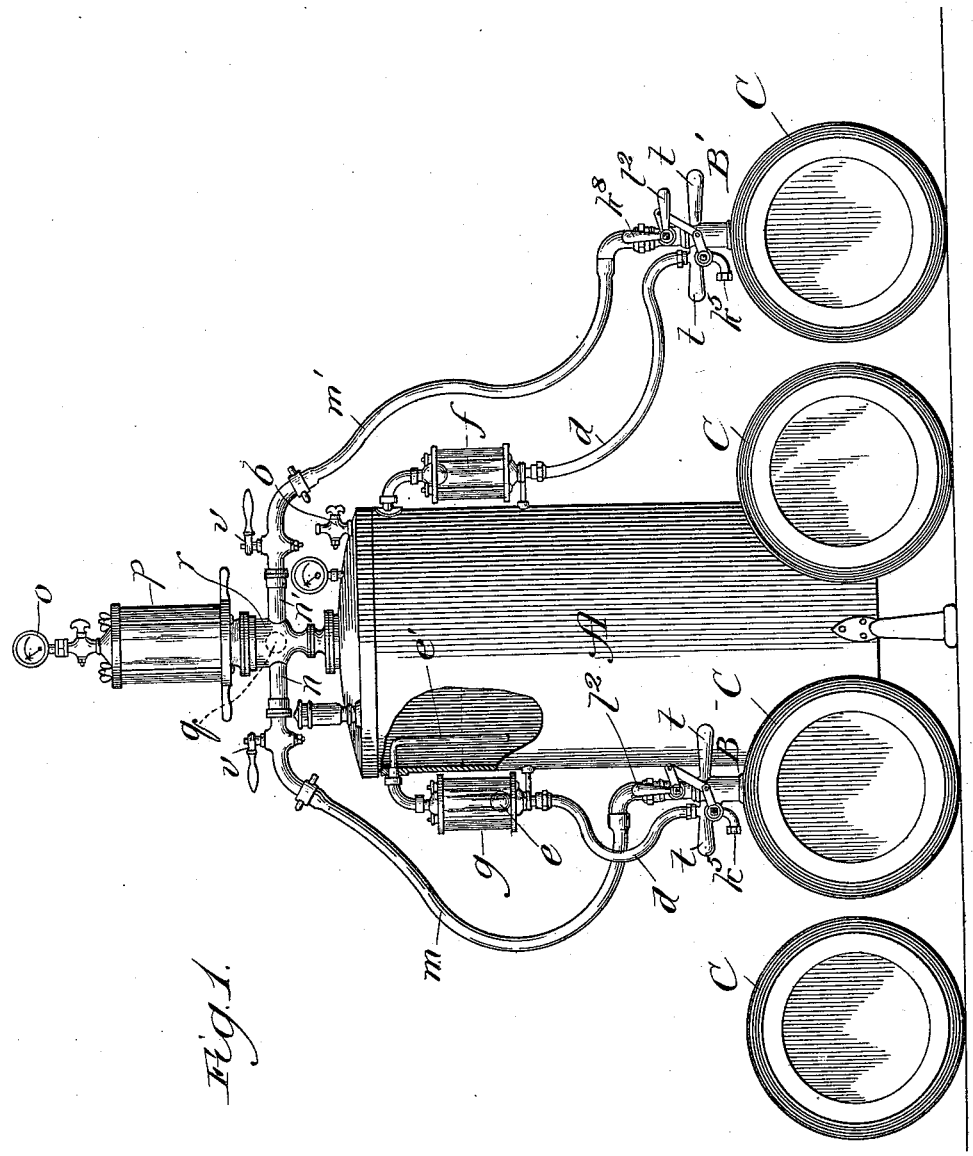

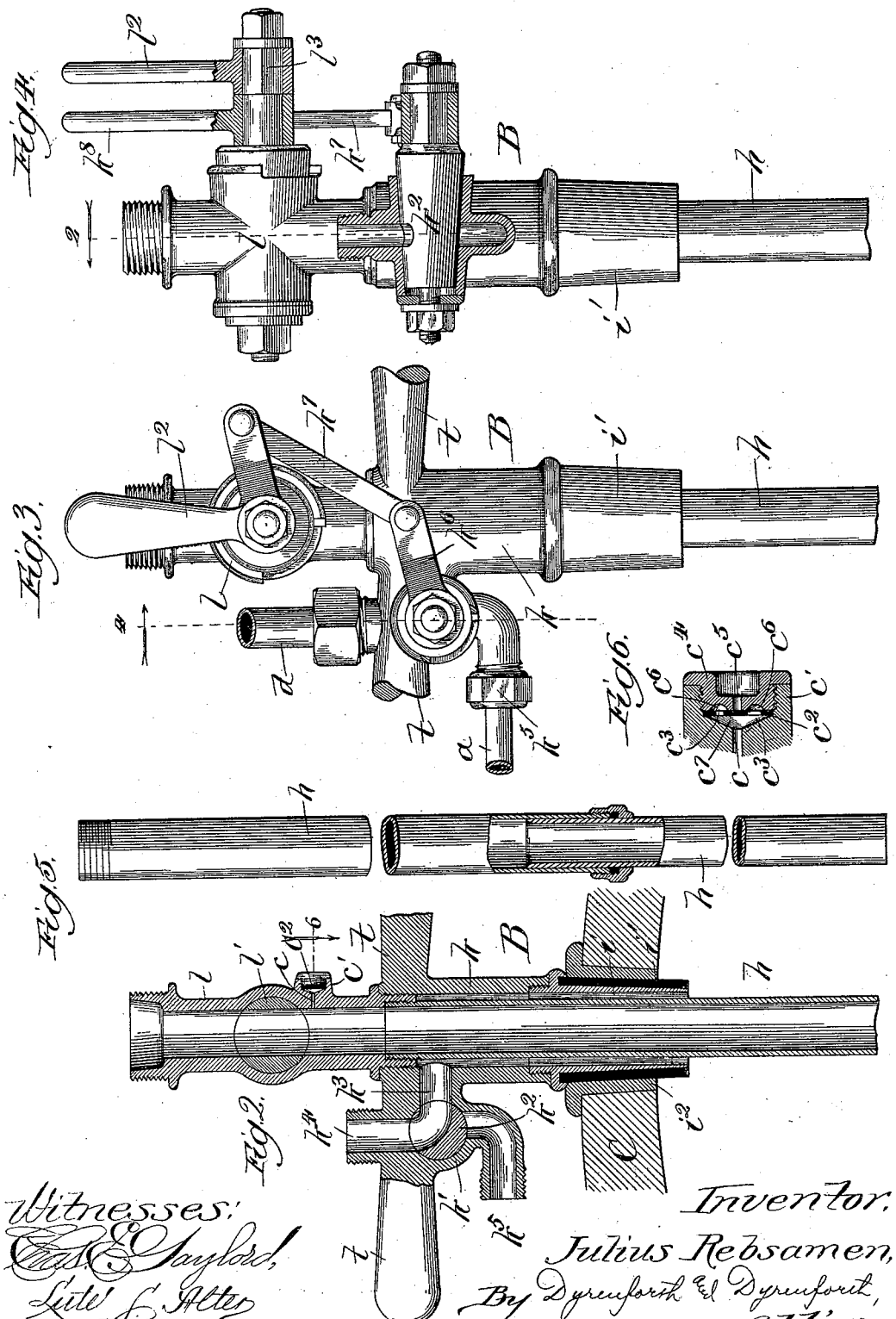

JULIUS REBSAMEN, OF CHICAGO, ILLINOIS.

RACKING APPARATUS.

SPECIFICATION forming part of Letters Patent No. 554,458, dated February 11, 1896.

Application filed August 17, 1895. Serial No. 559,667. (No model.)

*To all whom it may concern:*

Be it known that I, JULIUS REBSAMEN, a citizen of the United States, residing at Chicago, in the county of Cook and State of Illinois, have invented a new and useful Improvement in Racking Apparatus, of which the following is a specification.

My invention relates to an improvement in apparatus for racking off beer, or other carbonated beverages, into kegs, barrels, or other receptacles, ready for the market.

Referring to the accompanying drawings, Figure 1 is a broken view in elevation of a beer-racking apparatus provided with my improvement and shown in operation; Fig. 2, an enlarged broken view in longitudinal section of the valve mechanism to which my improvement relates, the section being taken at the line 2 on Fig. 4 and viewed in the direction of the arrow; Fig. 3, a broken view of the same in elevation; Fig. 4, a section taken at the line 4 on Fig. 3 and viewed in the direction of the arrow; Fig. 5, a broken view in elevation of the filling-tube; and Fig. 6, a section taken at the line 6 on Fig. 2, viewed in the direction of the arrow and enlarged.

A is a tank provided on its upper side with a head $r$ with which the supply-pipe from a filter (not shown) connects at $q$, and which is surmounted by a glass chamber or lantern $p$ carrying a gage $o$, as usual. From opposite sides of the head $r$ lead the discharge-pipes $n$ and $n'$, each containing a shut-off valve $v$; and from the discharge-pipes $n$ and $n'$ there lead the flexible pipes $m$ and $m'$, or hose, connected at their ends, respectively, with the tubular valve-heads B and B'. Each of these valve-heads comprises a +-shaped tubular section $l$ containing a rotary plug-valve $l'$ carrying an operating-handle $l^2$ on the projecting end of its stem. The section $l$ screws into a tube-section $k$ having rigid handles $t\,t$ extending at right angles to it from its opposite sides, and provided at one side with a hollow enlargement forming a chamber $k'$ for a rotary plug-valve $k^2$ and communicating through a passage $k^3$ with the interior of the section $k$ and having the passages $k^4$ and $k^5$ leading, respectively, from its upper and lower sides. The valve $k^2$ is constructed to adapt it to register with the passages $k^3\,k^4$ for connecting them, or with the passages $k^3\,k^5$ for a like purpose; and its stem carries a handle $k^6$ connected from its outer end by a link $k^7$ with one arm of a bell-crank $k^8$ forming the operating-lever for the valve $k^2$ and fulcrumed loosely on the stem $l^3$ of the valve $l'$, adjacent to the handle $l^2$ of the latter. The section $k$ has screwed into it a tapering extension $i$ surrounded by tubular packing $i'$ to fit in the bushing $i^2$ of the bung-hole of a barrel or keg C; and from the lower end of the tubular section $l$ there extends through and beyond the sections $k$ and $i$ the filling-pipe $h$ to enter to the desired depth, through its bung-hole, the receptacle to be filled.

At opposite sides of the tank A are supported the glass chambers or lanterns $g$ and $f$ each containing a float-valve $e$ and communicating from its upper end with a pipe $e'$ extending for a short distance downward into the tank from near its upper end; and each of the chambers $g$ and $f$ communicates from its lower end through a tube $d$ (preferably hose) with the passage $k^4$ leading to the adjacent valve $k^2$.

Adjacent to and below the valve $l'$ in the section $l$ is provided a small vent-passage $c$ opening into a depression $c^7$ in a protuberance $c'$ on the section, the depression being covered by a flexible (rubber) diaphragm $c^2$ containing openings $c^3$ at opposite sides of its center, and which is secured in place by a nut $c^4$ having a central passage $c^5$ leading to the outer air from the closed center of the diaphragm and flanked by depressions $c^6$ in the inner face of the nut.

The apparatus is employed for filling with beer a receptacle C at one side of the apparatus, while the carbonic-acid gas which escapes from that receptacle enters the tank A and thence enters a receptacle C at the opposite side of the apparatus to drive out the air from that receptacle and thus prepare it to be filled. Supposing that it be desired to fill the receptacle C at the right-hand side in Fig. 1, the connection with the filter having been made at $q$ and the valves $v$ in the pipes $n$ and $n'$ being opened, the handle $l^2$ is turned to open the valve $l'$ to the position in which it is illustrated in Fig. 2, thereby permitting the beer to flow freely through the pipe $m'$ into the barrel, and the handle $k^8$ is also turned to bring the valve $k^2$ to the position in which it is illustrated in Fig. 2 to connect the passages $k^3\ k^4$ and close the passage $k^5$. Meantime the valve $l'$ in the head B is in the position of closing the passage through the pipe $m$, and the valve $k^2$ is in the position of closing the passage $k^4$ and of connecting the passages $k^3\ k^5$. As the beer enters the barrel into which the pipe $m'$ leads, the carbonic-acid gas which escapes from it passes through the adjacent pipe $d$ and lantern $f$ into the tank A, and when a sufficient quantity has thus entered the tank to generate suitable pressure therein it passes through the tube $e'$, lantern $g$ and pipe $d$ leading therefrom into the adjacent receptacle C, in which it supplants the air contained in the receptacle, the displaced air passing upward through the tube $d$, lantern $e$ and pipe $e'$ into the tank, wherein, owing to its specific gravity being lighter than that of the carbonic-acid gas, it remains above the latter and may be let out from time to time by opening the vent-cock, (shown at $b$ in Fig. 1.)

When the receptacle C being filled from the head B' is full, a condition which is manifested by the flotation of the valve in the lantern $f$, the valves $l'$ and $k^2$ in that head require to be simultaneously and quickly shut off, the former to stop the supply of beer and the latter to close the passage $k^4$ and connect the passages $k^3\ k^5$ and allow the surplus pressure in the barrel to escape to the outer air or to any point to which a pipe $a$ may be led from the passage $k^5$. By placing the handles $l^2$ and $k^8$ closely together they may both be quickly and simultaneously operated with one hand, which is a very important advantage of my improvement.

While beer is flowing through the pipe $m'$ its pressure keeps the closed center of the diaphragm $c^2$ of the vent-valve in the section $l$ outward against the inner end of the passage $c^5$ to prevent the ingress of air from without; but when the flow of beer is stopped in withdrawing the tube $h$ from the barrel the beer contained in the tube will flow out into the barrel, being prevented from becoming air-bound in the tube by the ingress, through the vent, of air, which forces the diaphragm $c^2$ from its seat and opens the passage $c^5$ through the perforations $c^3$ at the depressions $c^6$, into the depression $c^7$ and thence through the passage $c$ into the beer-tube. As soon as one receptacle C has thus been filled, another (shown ready to be brought into position) is adjusted to the apparatus by inserting the then free pipe $h$ into the bung-hole, when the valves in the head B' are set into the positions described of those of the head B, and the valve $l$ in the latter is opened to permit the flow of beer through the pipe $m$ into the respective receptacle, and the valve $k^2$ in that head is turned to close the passage $k^5$ and connect the passages $k^3\ k^4$. These positions are occupied by the valves till the valve $e$ in the lantern $g$ floats—indicating that the receptacle has been filled—when the two handles $l^2$ and $k^8$ are quickly turned to shut off the flow of beer through the pipe $m$ and open the passage $k^5$ to the passage $k^3$ while closing the passage $k^4$ in the head $k$. Thereupon the head B is withdrawn from the filled receptacle C to permit the adjustment of another, to be preparatorily cleared of air by displacing it with gas from the tank A while the filling is being proceeded with of a receptacle on the opposite side of the apparatus.

As will thus be seen, the operation of the apparatus, which is, generally stated, to fill one barrel with beer, allowing the escaping gas to enter the tank A while a barrel on the opposite side of the apparatus is being prepared for filling by utilizing the gas from the barrel being filled to supplant the air in the empty barrel, is materially supplemented and facilitated by adapting the two valves $l'$ and $k^2$ to be quickly closed, respectively, to the beer-flow and to the passage $k^4$, as described, by a single movement of only one hand of the operator, and by preventing the beer contained below the valve $l'$ in the filling-pipe, after withdrawal from the receptacle, from becoming air-bound, great waste and fouling are avoided.

What I claim as new, and desire to secure by Letters Patent, is—

1. In a racking apparatus, the combination with the tank A of the pipes $m$ and $m'$ communicating with the supply-inlet for carbonated liquid to be racked, the heads B and B' on the ends of said pipes and each provided with a valve $l'$ for controlling the flow of liquid from the supply to the receptacle to be filled, and provided with an operating-handle on its stem, a valve $k^2$ controlling the passages $k^3$, $k^4$ and $k^5$, pipes $d$ leading from the passages $k^4$ into the tank and containing lanterns $g$, $f$ provided with valves $e$, and an operating-handle $k^8$ connected with the valve $k^2$ and fulcrumed on the stem of the valve $l'$ adjacent to its operating-handle, substantially as and for the purpose set forth.

2. In a racking apparatus, the combination with the tank A of the pipes $m$ and $m'$ communicating with the supply-inlet for carbonated liquid to be racked, the heads B and B' on the ends of said pipes and each provided with a valve $l'$ for controlling the flow of liquid from the supply to the receptacle to be filled, and provided with an operating-handle on its stem, a valve $k^2$ having a handle $k^6$ and controlling the passages $k^3$, $k^4$ and $k^5$, pipes $d$ leading from the passages $k^4$ into the tank and containing lanterns $g$, $f$ provided with valves $e$, and a bell-crank operating-lever $k^8$ fulcrumed on the stem of the valve $l'$ and connected by a link $k^7$ with the handle of the valve $k^2$, substantially as and for the purpose set forth.

JULIUS REBSAMEN.

In presence of—
M. J. FROST,
J. H. LEE.